United States Patent [19]
Dütting et al.

[11] Patent Number: 5,933,562
[45] Date of Patent: Aug. 3, 1999

[54] OPTICAL SEMICONDUCTOR COMPONENT WITH DEEP RIDGED WAVEGUIDE

[75] Inventors: Kaspar Dütting; Edgar Kühn, both of Stuttgart, Germany

[73] Assignee: Alcatel Alsthom Compagnie Generale d'Electricite, Paris, France

[21] Appl. No.: 09/029,195

[22] PCT Filed: Jun. 26, 1997

[86] PCT No.: PCT/EP97/03584

§ 371 Date: May 19, 1998

§ 102(e) Date: May 19, 1998

[87] PCT Pub. No.: WO98/00738

PCT Pub. Date: Jan. 8, 1998

[30] Foreign Application Priority Data

Jun. 28, 1996 [DE] Germany .......................... 196 26 130

[51] Int. Cl.⁶ .................................................. G02B 6/10
[52] U.S. Cl. ........................... 385/131; 385/130; 385/129
[58] Field of Search ...................... 385/129, 132

[56] References Cited

U.S. PATENT DOCUMENTS 5,790,737   8/1998   Aoyagi et al. ........................... 385/131

FOREIGN PATENT DOCUMENTS 0641049   3/1995   European Pat. Off. .
9800738   1/1998   WIPO .

OTHER PUBLICATIONS

"Theoretische Untersuchung optischer Wellenleitertaper auf InGaAsP/InP", H–P. Nolting et al, *Frequenz*, vol. 45, No. 5/06, May 1, 1991, pp. 130–140.

"Compact InGaAsP/InP laser diodes with integrated mode expander for efficient coupling to flat–ended singlemode fibres", T. Brenner et al, *Electronics Letters*, Aug. 17, 1995, vol. 31, No. 17, pp. 1443–1445.

"Monolithic Integration of GaInAsP/InP Collimating Grin Lens with Tapered Waveguide Active REgion", S. El Yumin et al, *Proc. of International Conf. on Indium Phosphide and Related Materials*, Hokkaido, May 9–13, 1995, pp. 721–724.

"Ultrahigh–bandwidth (42GHz) polarisation–independent ridge waveguide electroabsorption modulator based on tensile strained InGaAsP MOW", K. Satzke et al, *Electronics Letters*, Nov. 9, 1995, vol. 31, No. 23, pp. 2030–2032.

*Primary Examiner*—Phan T.H. Palmer
*Attorney, Agent, or Firm*—Ware, Fressola, Van Der Sluys & Adolphson LLP

[57] ABSTRACT

For use in digital optical telecommunication systems, optical semiconductor components are shown having a transition region for the expansion of the mode field of a light wave in order to reduce losses when coupling to an optical fiber or an optical waveguide of a supporting plate. An optical semiconductor component contains a deep ridged waveguide (RIDGE) with a cover layer (DS) disposed on a substrate (SUB.) The ridged waveguide (RIDGE) has a first (MQW) and second (BULK) waveguide cores, these being separated by a separating layer (SEP). The thickness of this separating layer increases in a transition region (UB1) along a longitudinal direction (L) of the ridged waveguide (RIDGE), thus increasing the vertical distance between the two waveguide centers (MQW, BULK).

8 Claims, 3 Drawing Sheets

OPTICAL SEMICONDUCTOR COMPONENT WITH DEEP RIDGED WAVEGUIDE

BACKGROUND OF THE INVENTION

1. Technical Field

The invention concerns an optical semiconductor component which has a substrate and a deep ridged waveguide with a cover layer arranged on the substrate.

2. Discussion of Related Art

Optical semiconductor components are used for digital optical telecommunication, e.g. as transmitting or receiving components, and are coupled to optical waveguides on a supporting plate, or to optical fibers. Optical semiconductor components with deep ridged waveguides are especially used for the highest bit frequencies in telecommunications, since they have the highest frequency bandwidth due to their low electrical capacity, as compared to optical semiconductor components with other types of waveguides.

A deep ridged waveguide is an optical waveguide formed of a mesa-shaped ridge on a substrate, and the ridge contains waveguide layers with a higher refraction index than the substrate. Especially in actively operated, i.e. controlled light absorbing or amplifying deep ridged waveguides, the ridge contains optically active semiconductor layers, and therefore a zone containing the transition from p-doped to n-doped semiconductor material. The ridge which is several $\mu$m wide is laterally surrounded by material that is electrically nonconducting and has a clearly smaller refraction index, such as e.g. air or polyimide.

In contrast thereto, a flat ridged waveguide represents an optical waveguide in which at least a part of the existing waveguide layers are arranged under a mesa-shaped ridge that is several $\mu$m wide. Particularly in actively operated flat ridged waveguides, the optically active semiconductor layers are not part of the ridge, thus the zone containing the transition from p-doped to n-doped semiconductor material is not laterally limited to the several $\mu$m wide ridge.

In order to couple without loss a light wave being conducted in an optical semiconductor component, into an optical waveguide or into an optical fiber, it is necessary to adapt the mode field of the light wave in the semiconductor component to the mode field of a light wave in the optical waveguide or the optical fiber. To that end, the mode field of the light wave being conducted in the semiconductor component is adiabatically amplified along the light propagation direction.

To adapt the mode field, the optical semiconductor components use waveguides with a transition area in which the waveguide, or individual layers of the waveguide, taper or widen in a lateral direction, meaning the direction in the substrate plane that is vertical to the light propagation direction, or in a vertical direction, meaning the direction that is vertical to the substrate plane. Such a transition area is also called a taper. A vertical taper particularly defines a transition area in which the thickness of a semiconductor layer increases or decreases, and a lateral taper defines a transition area in which the width of a waveguide increases or decreases along a longitudinal direction.

The article "Compact InGaAsP/InP laser diodes with integrated mode expander for efficient coupling to flat-ended single-mode fibre" (T. Brenner et al, Electronic Letters, Volume 31, No. 7 1995, pages 1443–1445) describes an optical semiconductor component with a flat ridged waveguide. It contains an optically active waveguide layer and a ridge arranged on this waveguide layer. The thickness of the optically active waveguide layer decreases in a transition area along a longitudinal direction of the ridged waveguide in the direction of an outlet facet of the component, and the ridged waveguide widens laterally in the direction of the outlet facet. The ridged waveguide and the transition area are equipped with electrodes, and are actively operated by applying a voltage.

The described semiconductor component has a higher capacity than semiconductor components with deeply etched ridged waveguides, particularly in the actively operated transition area. In addition, in a ridged waveguide in which the mode field adaptation takes place mainly through an actively operated lateral taper, higher modes than the basic mode are excited, so that such a waveguide loses its single modality.

SUMMARY OF INVENTION

The object of the invention is to present an optical semiconductor component that is suitable for the highest transmission rates, and can be coupled in a mostly loss-free manner to an optical fiber or to an optical waveguide According to the present invention an optical semiconductor component, which has a substrate and a deep ridged waveguide with a cover layer arranged on the substrate, wherein the ridged waveguide contains a first and a second (BULK) waveguide core, having respective refractive indexes that are greater than refractive indexes of the cover layer and the substrate, at least in a first transition area, the first waveguide core and the second waveguide core are separated by a separating layer, which has a refractive index that is smaller than the refractive indexes of both waveguide cores, and a thickness of the separating layer in a first transition area increases along a longitudinal direction L of the deep ridged waveguide, and a vertical distance between the first waveguide core and the second waveguide core increases along this longitudinal direction L.

In further accord with the present invention, the optical semiconductor component is characterized in that it has a front face for incoming or outgoing light signals, and the thickness of the separating layer increases along the longitudinal direction of the deep ridged waveguide toward the front face.

In further accord with the present invention, the optical semiconductor component is characterized in that the increase in the separating layer is continuous.

In further accord with the present invention, the optical semiconductor component is characterized in that the thickness of the second waveguide core in the first transition area increases along the same direction as the thickness of the separating layer.

In further accord with the present invention, the optical semiconductor component is characterized in that the first waveguide core contains a semiconductor packet with a multi-quantum well structure.

In further accord with the present invention, the optical semiconductor component is characterized in that in a second transition area, thickness of individual layers of the semiconductor packet of the first waveguide core decreases in said longitudinal direction in which the thickness of the separating layer increases.

In further accord with the present invention, the optical semiconductor component is characterized in that a width of the ridged waveguide in a third transition area increases along said longitudinal direction in which the thickness of the separating layer increases.

In further accord with the present invention, the optical semiconductor component is characterized in that on a front face, the ridged waveguide has a termination in a form of an integrated cylindrical lens with a base that has a hyperbolic, parabolic or circle segment shape.

DETAILED DESCRIPTION OF THE DRAWING

Two embodiments of the optical semiconductor components of the invention are described by means of FIGS. 1 to 5, where:

DETAILED DESCRIPTION OF PREFERRED EMBODIMENTS

The optical semiconductor component of the invention has a deep ridged waveguide arranged on a substrate. A basic idea of the invention is that this deep ridged waveguide contains two waveguide cores which are separated by a separation layer and that, in a first transition area of the ridged waveguide, the thickness of the separation layer increases along a longitudinal direction of the ridged waveguide, which increases the vertical distance of the two waveguide cores. This first transition area is used to adapt the mode field of a light wave being conducted in the ridged waveguide, to the mode field of a light wave in an optical fiber, or to an optical waveguide located on a supporting plate.

One advantage of the invention is that the adaptation of the mode field in this first transition area is independent of a variation of the layer thickness of the first waveguide core along the longitudinal direction of the ridged waveguide. The first waveguide core can contain optically active semiconductor layers, whose energy band gap is determined by thickness of its layer and the composition of its material. In this case the adaptation of the mode field is independent of the energy band gap of the optically active semiconductor layers, and the optical semiconductor component can therefore have active, i.e. controlled light amplifying or light absorbing waveguide areas, and passive, i.e. unamplified light conducting waveguide areas.

Figure 1:
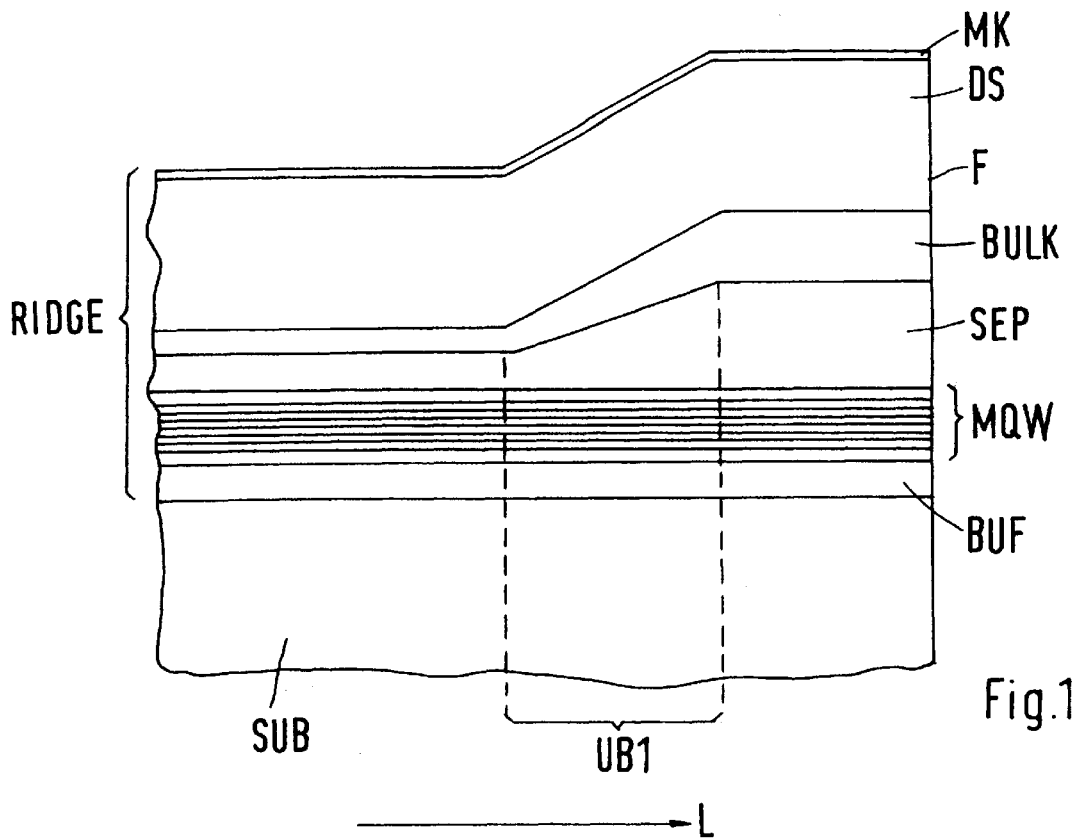
FIG. 1 is a cut through, i.e., a sectional view of an optical semiconductor component of the invention in a first embodiment along a longitudinal direction of a waveguide, vertical to the substrate plane.

FIG. 1 illustrates a cut through an optical semiconductor component BE1 of the invention in a first embodiment. The cut extends vertically to the plane of a substrate SUB along a longitudinal direction L of a deep ridged waveguide RIDGE.

The deep ridged waveguide RIDGE is arranged on the substrate SUB and contains superimposed a buffer layer BUF, a first waveguide core MQW, a separating layer SEP, a second waveguide core BULK, a cover layer DS and a metal contact layer MK.

The first and the second waveguide cores MQW, BULK respectively have a refraction index which is greater than the refraction indexes of the cover layer DS, the separating layer SEP, the buffer layer BUF and the substrate SUB. This causes a light wave to be conducted mainly in the two waveguide cores MQW, BULK. The first waveguide core MQW is separated from the second waveguide core BULK by the separating layer SEP.

In a first transition area UB1, the thickness of the separating layer SEP increases along the longitudinal direction L of the ridged waveguide RIDGE. This increases the vertical distance between the first and the second waveguide core MQW, BULK. In turn this causes the mode field of a light wave being conducted in the ridged waveguide RIDGE to be expanded. The increase in the thickness of the separating layer SEP is designed so that the mode field of the light wave being conducted in the ridged waveguide RIDGE is adapted to the mode field of a light wave in an optical fiber or an optical waveguide located on a supporting plate. The increase in the thickness of the separating layer SEP of the embodiment is such, that the layer's thickness increases approximately threefold along a length of 100 $\mu$m.

It is especially advantageous if the thickness of the separating layer SEP increases continuously along the longitudinal direction L of the ridged waveguide RIDGE. The light wave being conducted in the ridged waveguide RIDGE then suffers very little scatter and absorption in the first transition area UB1. The increase in the thickness of the separating layer SEP along the longitudinal direction L of the ridged waveguide RIDGE can take place linearly as in the first embodiment, or exponentially for example as well.

In a particularly advantageous configuration of the invention which achieves a particularly strong expansion of the mode field, the second waveguide core BULK is designed so that its thickness also increases in the transition area UB1 along the longitudinal direction L of the ridged waveguide RIDGE, namely in the same direction along which the thickness of the separating layer SEP increases as well. This is also depicted in the first embodiment.

The optical semiconductor component BE1 in the first embodiment has a front face F from which light signals can emerge, or through which light signals can enter into the optical semiconductor component BE1. An optical fiber or an optical waveguide located on a supporting plate can be coupled to this front face F. To that end the separating layer SEP is designed so that its thickness increases toward the front face F along the longitudinal direction L of the ridged waveguide RIDGE.

The first waveguide core MQW contains a semiconductor packet with a multi-quantum well structure, namely a packet of semiconductor layers in which a large and a small energy band gap alternate. The energy band gap in this case means the energy difference between the valence band and the conduction band of the material forming the layer. These semiconductor layers have the same thickness in all areas of the ridged waveguide RIDGE. Therefore the semiconductor component BE1 is operated actively, i.e. controlled light amplifying or light absorbing, in all areas of the ridged waveguide RIDGE. For example the function of the described component can be that of a directly modulatable laser, or also that of an optical amplifier.

In the first embodiment, the substrate SUB, buffer layer BUF, cover layer DS and separating layer SEP comprise a semiconductor of the III/V connection type, such as InP or GaAs. The two waveguide cores MQW, BULK comprise ternary or quaternary mixed crystals with elements of the main groups III and V, such as InGaAsP, InGaAs or InGaAlP. But compounds of elements from the main groups II and VI, IV and IV or I and VII are also suitable for the semiconductor component, depending on the wavelength at which the semiconductor component must operate.

Figure 2:
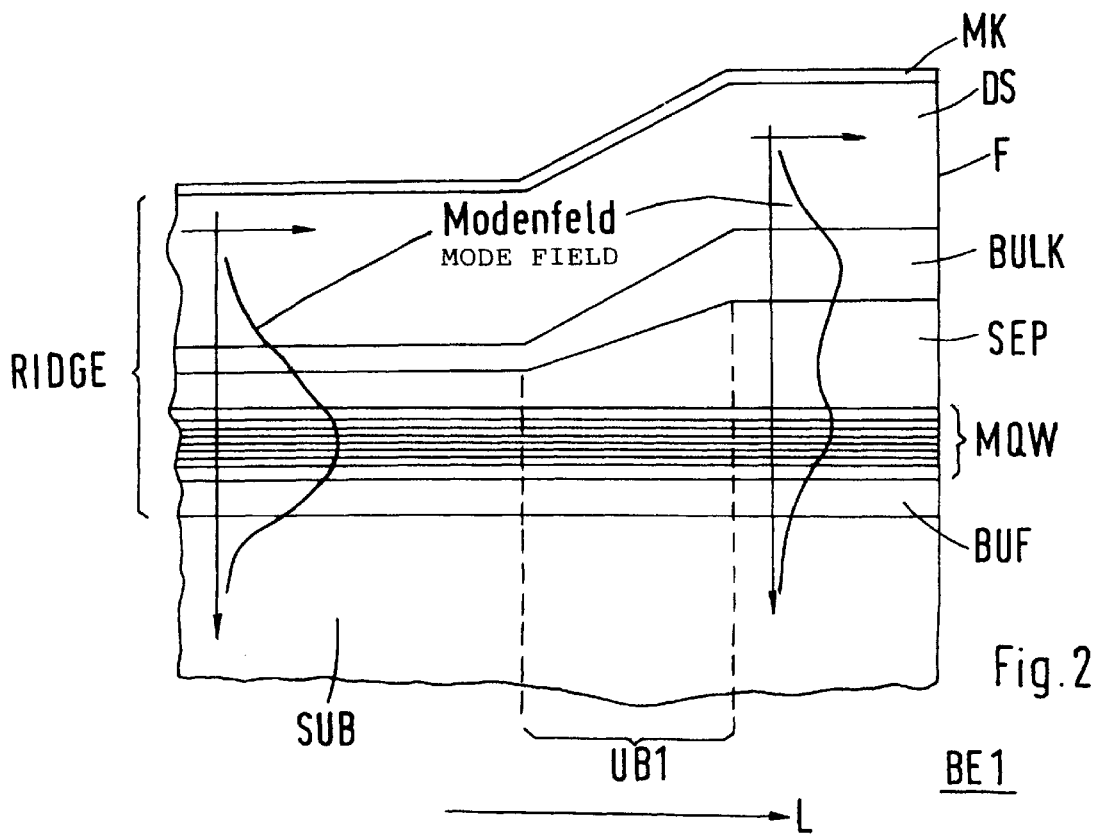
FIG. 2 is the same cut as in FIG. 1, and in addition the qualitative course of the mode field of a light wave being conducted in the waveguide, on both sides of a transition area.

In addition to the section of FIG. 1, FIG. 2 also illustrates qualitatively the course of the mode field of a light wave being conducted in the ridged waveguide RIDGE on both sides of the first transition area UB1. In that case the magnitude of the electrical field vector of the light wave is indicated for example in the longitudinal direction L of the ridged waveguide RIDGE, and a local coordinate is vertical to the substrate plane. The diagrams make it clear that the mode field of the light wave is expanded by the increase in the thickness of the separating layer SEP, since a light wave is conducted mostly in semiconductor layers with a higher refraction index than that of the surrounding material.

In addition to minimized coupling losses when coupled to an optical fiber or an optical waveguide on a supporting plate, the optical semiconductor component BE1 has the additional advantage that an alignment between semiconductor component and fiber or supporting plate is simplified, since greater alignment tolerances than with conventional optical semiconductor components with a deep ridged waveguide are permissible for a low loss coupling. Thus a misalignment of 2 µm for example in the semiconductor component BE1 of the first embodiment only increases the coupling losses by about 1 dB. Furthermore, no microlenses are required for coupling to an optical fiber, and simple single-mode optical fibers with a flat end can be used.

Figure 3:
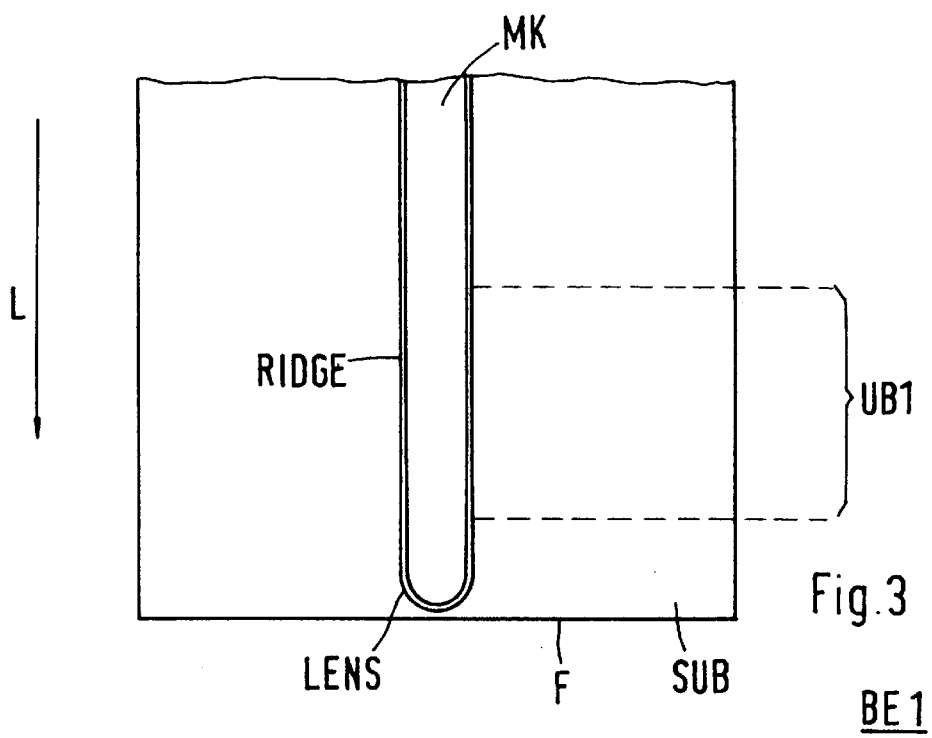
FIG. 3 is a top view of the semiconductor component in the first embodiment.

FIG. 3 illustrates a top view of the semiconductor component BE1 in the first embodiment. The substrate SUB, over which the deep ridged waveguide RIDGE is placed, can be seen. The ridged waveguide RIDGE has the form of a mesa strip. A metal contact layer MK is applied to the full length of the ridged waveguide RIDGE. The thickness of the separating layer SEP in the first transition area UB1 increases along the longitudinal direction L.

On the front face F, the ridged waveguide RIDGE has a termination in the form of an integrated cylindrical lens LENS. The base of this integrated cylindrical lens LENS can be hyperbolic, parabolic or have the shape of a circle segment.

The special advantage of this design is that the cylindrical lens produces an additional expansion of the light wave's mode field. A suitable shape of the cylindrical lens base achieves that the mode field of the outgoing light wave is symmetrical, i.e. that the outgoing light wave produces a circular light spot instead of an elliptical one. In this configuration with a symmetrical mode field the coupling losses are minimal.

Figure 4:
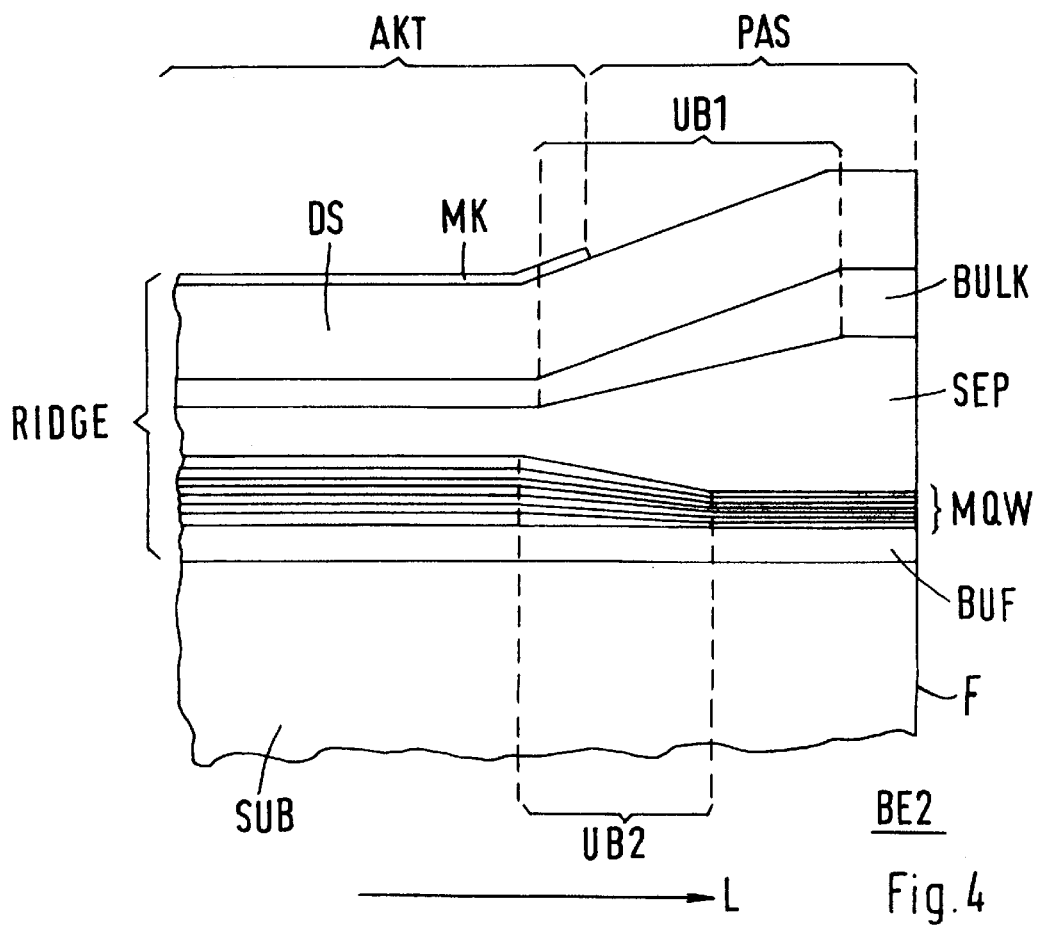
FIG. 4 is a cut through an optical semiconductor component of the invention in a second embodiment along a longitudinal direction of a waveguide, vertical to the substrate plane.

FIG. 4 illustrates a section of an optical semiconductor component BE2 of the invention in a second embodiment. As in FIG. 1, the cut is vertical to the plane of a substrate SUB along a longitudinal direction L of a deep ridged waveguide RIDGE.

The construction of the semiconductor component BE2 in the second embodiment is similar to that of the first. The deep ridged waveguide RIDGE is placed on the substrate SUB. This deep ridged waveguide RIDGE contains superimposed a buffer layer BUF, a first waveguide core MQW, a separating layer SEP, a second waveguide core BULK, a cover layer DS and a metal contact layer MK. In a first transition area UB1, the thickness of the separating layer SEP and the thickness of the second waveguide core BULK increase along the longitudinal direction L of the deep ridged waveguide RIDGE in the direction of a front face F.

In the second embodiment as well, the first waveguide core MQW contains a semiconductor packet with a multi-quantum well structure. In contrast to the first embodiment, the semiconductor layers of the multi-quantum well structure do not have the same thickness in all areas of the ridged waveguide RIDGE. The thickness of the individual semiconductor layers in a second transition area UB2 decreases along the longitudinal direction L of the ridged waveguide RIDGE. The reduction in the thickness of the individual semiconductor layers takes place in the direction in which the thickness of the separating layer SEP increases.

The energy band gap of the multi-quantum well structure, and thereby the wavelength at which a multi-quantum well structure is optically active, depends essentially on the thickness of its individual semiconductor layers. The reduction in the thickness of the individual semiconductor layers in the second transition area UB2 shifts the wavelength, at which the multi-quantum well structure is optically active, to shorter wavelengths. This makes it possible to operate a part of the ridged waveguide RIDGE passively, i.e. by conducting unamplified light. The optical semiconductor component BE2 has an active waveguide area AKT in which the semiconductor layers are thicker, and a passive waveguide area PAS in which the semiconductor layers are less thick. A metal contact layer MK is only applied to the active waveguide area AKT of the ridged waveguide RIDGE.

It is advantageous that the second transition area UB2 is arranged so that it overlaps at least part of the first transition area UB1. This achieves an altogether shorter length of the semiconductor component BE2. However, it is advantageous if the second transition area UB2 is arranged in the longitudinal direction L partially before, or in the front part of the first transition area UB1, because in that case the active waveguide area AKT, which must be pumped up by injecting a current, does not extend over the entire first transition area UB1, which reduces the current demand and lowers the electrical capacity.

The particular advantage of the optical semiconductor component BE2 in the second embodiment rests in that the adaptation of the mode field of a light wave in the first transition area UB1 is not dependent on a change in the energy band gap of the multi-quantum well structure. This achieves above all that the optical semiconductor component BE2 operates independently of polarization, i.e. that it processes light signals with different polarization directions equally.

Figure 5:
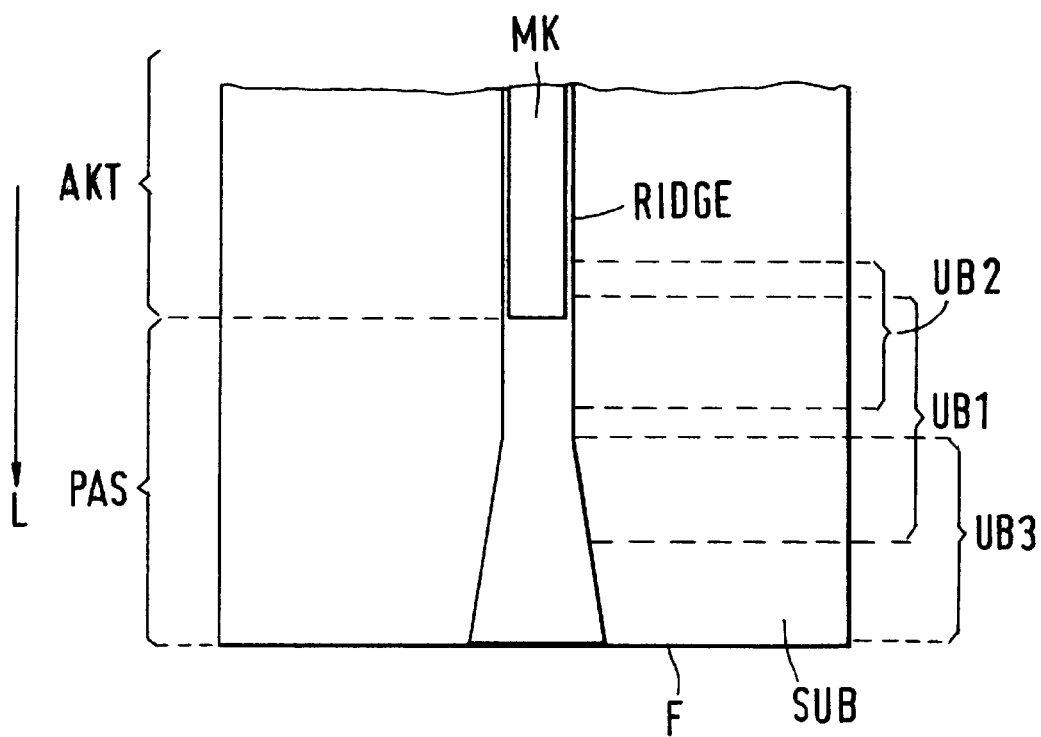
FIG. 5 is a top view of the semiconductor component in the second embodiment.

FIG. 5 shows a top view of the optical semiconductor component BE2 in the second embodiment. It illustrates the substrate SUB with a deep ridged waveguide RIDGE placed on it.

The thickness of the separating layer SEP in the first transition area UB1 increases along the longitudinal direction L. In the second transition area UB2, the thickness of the individual layers of the multi-quantum well structure of the first waveguide core MQW decreases in the longitudinal direction L, which causes the ridged waveguide RIDGE to have an active AKT and a passive PAS waveguide area. The width of the ridged waveguide RIDGE in a third transition area increases along the longitudinal direction L toward the front face F. This causes an additional expansion of the mode field of a light wave conducted in the ridged waveguide RIDGE, especially in the lateral direction.

The third transition area UB3 is arranged so that in the longitudinal direction L at least most of it is located behind the second transition area UB2, and partly overlaps the first transition area UB1. In this way the third transition area UB3, in which the ridged waveguide RIDGE expands laterally, is located entirely or at least mostly in the passive waveguide area PAS, and thus no higher order modes can be excited, even with a strong lateral expansion. The ridged waveguide RIDGE therefore has a single mode.

The special advantage of the ridged waveguide RIDGE expansion lies in that, with a suitable expansion size, an outgoing light wave has a symmetrical mode field, which minimizes coupling losses.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An optical semiconductor component (BE1; BE2), which has a substrate (SUB) and a deep ridged waveguide (RIDGE) with a cover layer (DS) arranged on the substrate (SUB), wherein:

the ridged waveguide (RIDGE) contains a first (MQW) and a second (BULK) waveguide core, having respective refractive indexes that are greater than refractive indexes of the cover layer (DS) and the substrate (SUB), at least in a second transition area (UB2), the first waveguide core (MQW) and the second waveguide core (BULK) are separated by a separating layer (SEP), which has a refractive index that is smaller than the refractive indexes of both waveguide cores (MQW, BULK), and a thickness of the separating layer (SEP) in a first transition area (UB1) increases along a longitudinal direction L of the deep ridged waveguide (RIDGE), and a vertical distance between the first waveguide core (MQW) and the second waveguide core (BULK) increases along this longitudinal direction L.

2. An optical semiconductor component (BE1; BE2) as claimed in claim 1, characterized in that the first waveguide core (MQW) contains a semiconductor packet with a multi-quantum well structure.

3. An optical semiconductor component (BE1; BE2) as claimed in claim 2, characterized in that in the second transition area (UB2), thickness of individual layers of the semiconductor packet of the first waveguide core (MQW) decreases in said longitudinal direction (L) in which the thickness of the separating layer (SEP) increases.

4. An optical semiconductor component (BE1; BE2) as claimed in claim 1, characterized in that a thickness of the second waveguide core (BULK) in the first transition area (UB1) increases along the same direction (L) as the thickness of the separating layer (SEP).

5. An optical semiconductor component (BE1; BE2) as claimed in claim 1, characterized in that it has a front face (F) for incoming or outgoing light signals, and the thickness of the separating layer (SEP) increases along the longitudinal direction L of the deep ridged waveguide (RIDGE) toward the front face (F).

6. An optical semiconductor component (BE1; BE2) as claimed in claim 1, characterized in that the increase in the separating layer is continuous.

7. An optical semiconductor component (BE1; BE2) as claimed in claim 1, characterized in that a width of the ridged waveguide (RIDGE) in a third transition area (UB3) increases along said longitudinal direction (L) in which the thickness of the separating layer (SEP) increases.

8. An optical semiconductor component (BE1; BE2) as claimed in claim 1, characterized in that on a front face (F), the ridged waveguide (RIDGE) has a termination (LENS) in a form of an integrated cylindrical lens with a base that has a hyperbolic, parabolic or circle segment shape.

* * * * *

UNITED STATES PATENT AND TRADEMARK OFFICE
CERTIFICATE OF CORRECTION

PATENT NO. : 5,933,562
DATED : August 3, 1999
INVENTOR(S) : Dutting, et. al.

It is certified that error appears in the above-identified patent and that said Letters Patent is hereby corrected as shown below:

At col. 7, line 27 (claim 1, line 10), please cancel "second transition area (UB2)" and substitute --first transition area (UB1)--.

Signed and Sealed this

Twenty-fourth Day of October, 2000

Attest:

Q. TODD DICKINSON

Attesting Officer

Director of Patents and Trademarks